UNITED STATES PATENT OFFICE.

ARTHUR HAUSDÖRFER, OF ELBERFELD, GERMANY, ASSIGNOR TO FARBENFABRIKEN OF ELBERFELD CO., OF NEW YORK, N. Y.

BLUE TRIPHENYLMETHANE DYE AND PROCESS OF MAKING SAME.

SPECIFICATION forming part of Letters Patent No. 676,555, dated June 18, 1901.

Application filed March 19, 1901. Serial No. 51,908. (No specimens.)

*To all whom it may concern:*

Be it known that I, ARTHUR HAUSDÖRFER, doctor of philosophy, chemist, (assignor to the FARBENFABRIKEN OF ELBERFELD COMPANY, of New York,) residing at Elberfeld, Germany, have invented a new and useful Improvement in Blue Triphenylmethane Dyes and Processes of Making Same; and I hereby declare the following to be a clear and exact description of my invention.

I have found that valuable new dyestuffs capable of dyeing wool from acid-baths pure blue shades are obtained by condensing symmetrical dibenzyl-meta-xylidin disulfonic acid having in a free state the formula

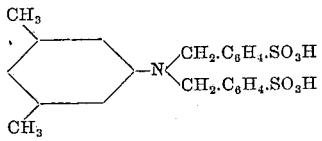

with tetraälkyl-diamidobenzhydrols, such as tetramethyl- or tetraethyl-para-diamidobenzhydrol or the like, and then oxidizing the resulting leuco compounds in a suitable manner.

The new coloring-matters have in a free state the following general formula:

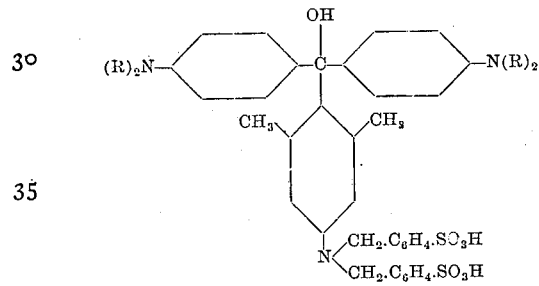

(R meaning an alkyl radical—such as methyl, ethyl, or the like.) They contain the two methylic groups in ortho position to the methane carbon and represent when dry and pulverized dark powders having a metallic luster, which are soluble in water with a blue color. They dye wool from acid-baths clear blue shades, which are distinguished by great fastness to alkalies.

In order to produce the said dibenzyl-metaxylidin disulfonic acid, I can proceed as follows, the parts being by weight: A mixture of forty-eight parts of symmetrical metaxylidin, one hundred and twenty parts of benzyl chlorid, and two hundred parts of a twenty-per-cent. caustic-soda lye is boiled for about twenty-four hours. The unchanged benzyl chlorid is then distilled off by means of steam. On cooling the reaction mass the symmetrical dibenzyl-meta-xylidin separates in the shape of an oil which soon solidifies. By a recrystallization from alcohol it is obtained in the form of colorless needles melting at 83° centigrade. In order to transform the product thus obtained into the disulfonic acid, forty parts are dissolved in eighty parts of cold sulfuric monohydrate. The resulting solution is then slowly mixed with forty-five parts of fuming sulfuric acid, (containing seventy per cent. of $SO_3$,) care being taken that the temperature does not surpass 20° centigrade. After having been allowed to stand for some hours at the ordinary temperature the reaction mixture is poured on ice, and the symmetrical meta-xylidin-dibenzyl disulfonic acid is separated in the shape of its sodium salt in the usual manner.

In carrying out the process for the production of the above-mentioned new dyestuff of the triphenylmethane series I can proceed as follows: 16.5 parts of the sodium salt of symmetrical dibenzyl-meta-xylidin disulfonic acid dissolved in two hundred parts of water are stirred into a solution of nine parts of tetramethyl-diamidobenzhydrol in ninety parts of water and fifteen parts of sulfuric acid of 66° Baumé. Subsequently the reaction mixture is heated to about from 90° to 100° centigrade until the whole hydrol has entered into reaction with the xylidin derivative. The leucodisulfonic acid thus produced is then transformed in the usual manner into the calcium salt and this into the sodium salt, which can be converted by oxidation into the respective coloring-matter in the following manner: Fifteen parts of the sodium salt of the leucodisulfonic acid are dissolved in one hundred and sixty parts of water, and after the addition of sixteen parts of a fifty-per-cent. acetic acid at a temperature of about 50° centigrade twenty-four parts of a lead dioxid paste (containing twenty per cent. of $PbO_2$) are stirred into the liquid. When the oxidation is finished, the mixture is neutralized by the addition of sodium carbonate, and the coloring-matter thus prepared is precipitated therefrom by the addition of common salt. By redissolving it in water and precipitating therefrom again it is freed from the lead carbonate contained therein, the resulting coloring-matter, having in a free state the formula

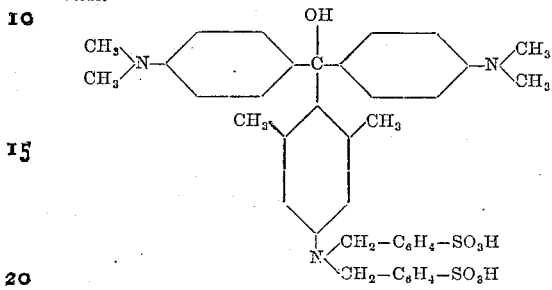

represents a reddish-brown powder having a metallic luster. It is readily soluble in water with a pure blue color, which is not changed by the addition of ammonia or sodium carbonate. By concentrated sulfuric acid (of 66° Baumé) it is dissolved with a yellowish-brown color, which is not changed on the addition of a small quantity of ice, while the color is changed into greenish-yellow and then into green on the addition of a larger quantity of ice. The new coloring-matter dyes wool from acid-baths clear blue shades, which are distinguished by great fastness to alkalies.

The process proceeds in an analogous manner if in the above example instead of tetramethyl-diamidobenzhydrol for instance, tetraethyl-diamidobenzhydrol is used.

It may be remarked that the same dyestuffs can also be obtained by, first, condensing non-sulfonated symmetrical dibenzyl-meta-xylidin with the hydrol; secondly, sulfonating the leuco compound thus obtained, and, finally, oxidizing the same.

Having now described my invention and in what manner the same is to be performed, what I claim as new, and desire to secure by Letters Patent, is—

1. The process for producing new triphenylmethane dyestuffs, which process consists in first condensing symmetrical dibenzyl-meta-xylidin disulfonic acid having the formula:

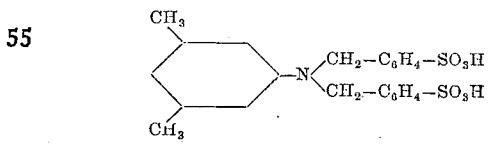

with tetraälkyl-para-diamidobenzhydrols, secondly oxidizing the resulting leuco compounds and finally isolating the dyestuff sulfonic acids thus produced in the form of their alkaline salts, substantially as hereinbefore described.

2. The process for producing a new triphenylmethane dyestuff having, in a free state, the formula:

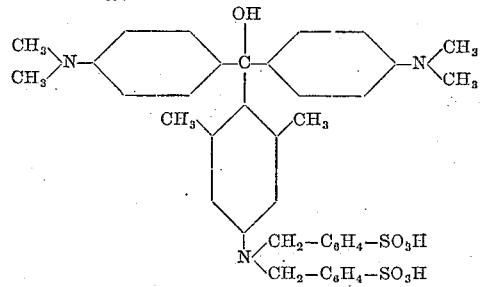

which process consists in first condensing symmetrical dibenzyl-meta-xylidin disulfonic acid with tetramethyl-para-diamidobenzhydrol, secondly oxidizing the resulting leuco compound and finally isolating the dyestuff sulfonic acid thus produced in the form of an alkaline salt, substantially as hereinbefore described.

3. The herein-described new dyestuffs of the triphenylmethane series being, when dry and pulverized, dark powders having a metallic luster which are soluble in water with a blue color, dyeing wool from acid-baths clear blue shades distinguished by great fastness to alkalies, substantially as hereinbefore described.

4. The herein-described new dyestuff of the triphenylmethane series, obtained from symmetrical dibenzyl-meta-xylidin disulfonic acid and tetramethyl-para-diamidobenzhydrol, being, when dry and pulverized, in the shape of its sodium salt a reddish-brown powder having a metallic luster readily soluble in water with a pure blue color which is not changed by the addition of ammonia or sodium carbonate, being dissolved by concentrated sulfuric acid of 66° Baumé with a yellowish-brown color which is not changed on the addition of a small quantity of ice, while it is changed into greenish-yellow and then into green on adding a larger quantity of ice, dying wool from acid-baths clear blue shades which are distinguished by great fastness to alkalies, substantially as hereinbefore described.

In testimony whereof I have signed my name in the presence of two subscribing witnesses.

ARTHUR HAUSDÖRFER.

Witnesses:
OTTO KÖNIG,
EMIL BLOMBERG.